March 26, 1935. C. S. BROWN Re. 19,508

ROLLER BEARING CONSTRUCTION

Original Filed Sept. 22, 1932

INVENTOR.
Charles S. Brown
BY
Bodell & Thompson
ATTORNEYS.

Reissued Mar. 26, 1935

Re. 19,508

UNITED STATES PATENT OFFICE 19,508

ROLLER BEARING CONSTRUCTION

Charles S. Brown, Syracuse, N. Y.

Original No. 1,943,418, dated January 16, 1934, Serial No. 634,413, September 22, 1932. Application for reissue November 20, 1934, Serial No. 753,996

4 Claims. (Cl. 29—84)

This invention relates to roller bearings, and has for its object, a one-piece cylindrical cage for the rollers, which is particularly simple and economical in construction, and in which the rollers are readily assembled, and the method of assembling the rollers in the one-piece cage.

The invention consists in the novel features and in the combinations and constructions hereinafter set forth and claimed.

In describing this invention, reference is had to the accompanying drawing, in which like characters designate corresponding parts in all the views.

Figure 1:
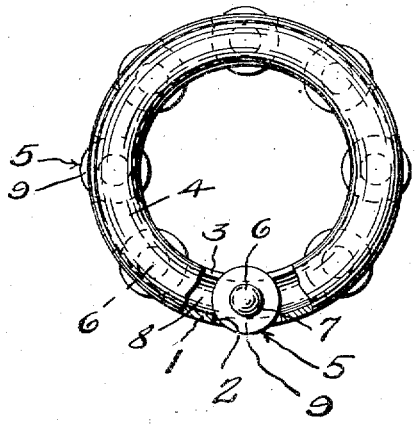
Figure 1 is an end view of this roller bearing, partly broken away.
Figure 2:
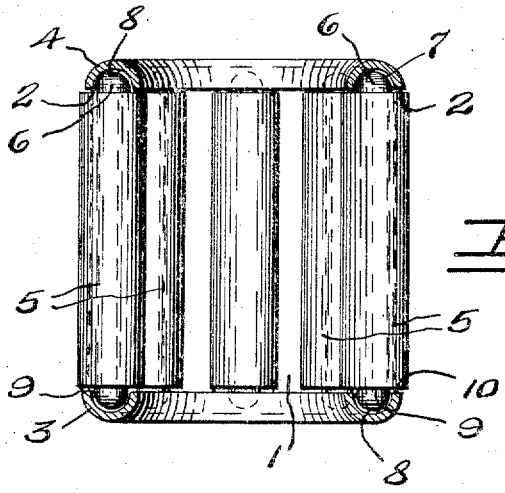
Figure 2 is a longitudinal sectional view of this bearing.

This roller bearing comprises a one-piece cage comprising a barrel portion formed with roller receiving slots, and integral outwardly extending annular heads or flanges at its ends shaped to form channels, rollers in the cage having peripheral portions extending into the slots, and axles at its ends extending into the channels of the heads, the heads being rounding, or arcuate, in cross section to provide rounding grooves, or channels, and the axles having the ends rounded correspondingly. Preferably, the ends of the rollers at the base of the axles thrust against one or the other of the end walls of the roller receiving slots to relieve the axles from end thrust.

The method of assembling the rollers in the cage consists in forming the cage with the heads, but leaving one of the heads displaced to permit the insertion of the rollers in the slots and with the axles at like ends of the rollers in the groove of the head that is not displaced, and then forcing or spinning the displaced head into final position, the rounding ends of the axles serving as abutments, or dies, for the displaced head during the spinning or pressing operation.

1 designates the barrel of the cage which is provided with roller receiving slots 2 extending nearly the full length thereof.

3 and 4 designate respectively, the heads, or annular flanges, at opposite ends of the barrel portion, these being integral with the barrel portion, and formed arcuate in cross section, one of the heads, as 4, being initially displaced.

5 designates the rollers, these having axles 6 at their ends which are rounded as at 7 to conform to the rounded surface of the channels 8 of the heads.

The slots 2 are preferably of less width than the diameter of the rollers. Preferably, the end faces 9 of the rollers around the axles 6 thrust against the end walls 10 of the slots 2 and thus relieve the axles 6 from thrusting against the heads, so that practically the only strain on the axles is that required to hold the rollers from inward displacement.

Figure 3:
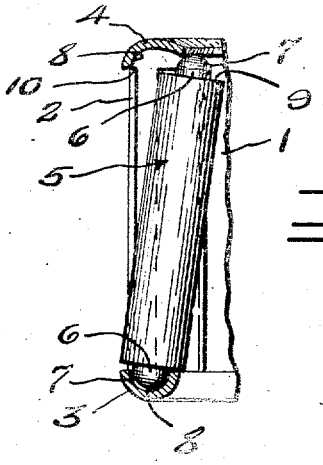
Figure 3 is a fragmentary view, similar to Figure 2, showing one of the heads of the cage displaced outwardly to permit the assembly of the rollers in the cage before the displaced head is pressed into final position.

In assembling the rollers in the one-piece sheet metal cage, the rollers are inserted in the cage through the end thereof at which the displaced, or partly displaced, head 4 is located, with the axles 6, at like ends of the rollers, in the groove of the head 3, they being temporarily held in this position in any suitable manner. As seen in Figure 3, in placing the rollers in the cage, the rounded axle 6 at one end of each roller is seated in the arcuate groove of the head 3 which is undisplaced, the roller standing inclined. Then the roller is rocked or swung about the transverse axis of the rounded axle 6 in the groove 3 thus carrying the other axle under the displaced head 4. The displaced head is then forced into its final position. Owing to this arrangement and operation, and due to the rounded axles 6, but a small initial displacement of the head 4 is necessary. When the head or flange 4 is forced inwardly into final position, the axles 6 of the rollers are interlocked in the grooves of the heads, or flanges 3, 4. The forcing operation may be performed in any well known manner, as by spinning, or by dies, and the rounded ends of the axles 6 form abutments, or anvil surfaces against which the flange or head 4 presses during the forcing operation. Preferably, as shown in Figure 3, the flange 4 is but partly displaced sufficiently to permit the rollers to be snapped in the flange 4 and thereafter the flange 4 is spun into its final position.

This roller bearing is especially economical to manufacture, in that the cage consists of one-piece of sheet metal in which the rollers are readily and economically assembled.

What I claim is:

1. The method of assembling rollers in a one-piece cage, which consists of a barrel portion formed with roller receiving slots, and heads at the ends of the barrel portion having annular grooves for receiving axles at the ends of the rollers, consisting in leaving one of the heads initially displaced outwardly for permitting the insertion of the rollers into the slots, inserting the rollers with their axles in the groove of the undisplaced head at an inclined angle to their final position and tilting them about the ends of the axles, as fulcrums, in the groove of the undisplaced head to carry the axle at their other end under the displaced head, and thereafter folding the initially displaced head into final position.

2. The method of assembling rollers in a one-piece cage, which consists of a barrel portion formed with roller receiving slots, and heads at the ends of the barrel portion for receiving axles at the ends of the rollers, said heads having annular grooves arcuate in cross section and the axles having spherically rounded ends, said method consisting in leaving one of the heads initially displaced outward, inserting the rollers into the cage through the end thereof at which the displaced head is located, rocking the rollers outward about the transverse axes of the spherical ends of the axles seated in the groove of the undisplaced head, thereby bringing the axles at the other ends of the rollers under the displaced head and forcing the displaced head into final position.

3. The method of assembling rollers in a one-piece container which consists of a barrel portion and heads at the ends of the barrel portion having annular grooves for receiving axles at the ends of the rollers, consisting in leaving one of the heads initially displaced outwardly for permitting the insertion of the rollers in the barrel portion, inserting the rollers with their axles at like ends in the groove of the undisplaced head at an inclined angle to their final position and tilting them about the ends of the axles as fulcrums into the groove of the undisplaced head to carry the axles at their other ends under the displaced head and thereafter folding the initially displaced head into final position.

4. The method of assembling rollers in a one-piece cage or container which consists of a barrel portion and heads at the ends of the barrel portion having annular grooves for receiving the ends of the rollers consisting in leaving one of the heads initially displaced outwardly for permitting the insertion of the rollers endwise into the cage or container, inserting the rollers with their ends in the groove of the undisplaced head and arranging the rollers so that their other ends are under the displaced head and thereafter folding the initially displaced head into final position.

CHARLES S. BROWN.